United States Patent [19]

Warrick

[11] 4,281,330

[45] Jul. 28, 1981

[54] MEDICAL PROCEDURES MONITORING AND RECORDING DEVICE

[76] Inventor: Nancy J. Warrick, 5104 Robertson Ave., Carmichael, Calif. 95608

[21] Appl. No.: 122,485

[22] Filed: Feb. 19, 1980

[51] Int. Cl.[3] .......... G01D 9/00

[52] U.S. Cl. .......... 346/20; 346/33 ME

[58] Field of Search .......... 346/33 R, 33 ME, 20

[56] References Cited

U.S. PATENT DOCUMENTS

| | | | |
|---|---|---|---|
| 3,725,947 | 4/1973 | Albertini et al. | 346/33 R |
| 3,911,446 | 10/1975 | Albertini | 346/33 R |
| 4,088,990 | 5/1978 | Sass | 346/20 X |

*Primary Examiner*—George H. Miller, Jr.
*Attorney, Agent, or Firm*—Melvin R. Stidham

[57] ABSTRACT

A device for recording and monitoring medical procedures, particularly during emergency treatment, including a keyboard with several groups of keys, one group representing different medical treatments, another representing different medications, another representing various dosages, as for example in c.c.'s and one representing numerical digits. When the keys are depressed a signal is transmitted to a microprocessor which routes it to a LED digital display for visual confirmation. Then, an "Enter" key, which is pressed at the time the treatment is actually effected, transmits the signals representing treatment, dosage, etc. selected by the depressed keys to the microprocessor which transmits the data, along with signals representative of the time of day from a clock circuit, simultaneously to a thermal printing device and to a tape recorder. In the meantime, signals from an external electrocardiogram machine are continuously being transmitted to the tape recorder to be recorded on a second channel.

8 Claims, 2 Drawing Figures

MEDICAL PROCEDURES MONITORING AND RECORDING DEVICE

BACKGROUND OF THE INVENTION

According to present practice, the precise time that events effected during medical procedures, particularly during an emergency, are almost impossible to record accurately or completely. Procedures taken during a medical emergency are usually written on paper as time and opportunity permit, they are seldom recorded precisely at the times, or in the actual sequence, in which they are given. The attending medical professional is often working under considerable tension and haste and cannot stop to note procedures taken and medication given at the time of the event. Further, notes of procedures and medications are usually not made on, or with any time relationship to, an electrocardiogram, which is registering the heart beat. The EKG machine cannot be stopped to record the medication or treatment on the strip itself, because critical changes in the heart beat, or even cardiac arrests, could take place at any time.

OBJECTS OF THE INVENTION

It is an object of this invention to provide a device for recording and monitoring events of a medical procedure as they occur.

It is a further object of this invention to provide a simple means for keeping an accurate and permanent record of a series of medical procedures.

It is a further object of this invention to provide means for recording easily and simultaneously events of an emergency medical procedure and signals representative of an electrocardiogram reading to show a direct relationship between change in the EKG and such events.

It is a further object of this invention to provide means for recording events of a medical procedure and the time at which they occurred precisely at, or very close to, the time at which they occurred.

Other objects and advantages of this invention will become apparent from the description to follow, particularly when read in conjunction with the accompanying drawings.

SUMMARY OF THE INVENTION

In carrying out this invention, I provide a keyboard that has several groups of keys representing types of treatment, types of medication, the amount of dosage, etc. When a key is depressed, a signal indicative of the event or quantity it represents is transmitted to a microprocessor which routes it to a visual LED display for confirmation. Then, when the event or treatment is actually performed, an "Enter" button is depressed and a signal representative of the data is transmitted to the microprocessor which transmits it simultaneously to a thermal printing device and to a magnetic tape recorder. At the same time, a signal indicating the time of day is received by the microprocessor from a clock circuit and sent to the two recording devices for printing and taping. In the meantime, signals from an external EKG machine are also transmitted to the tape recorder to be recorded on a separate channel with the treatment signals so that there will be a recorded time relationship between treatment events and EKG reading.

DESCRIPTION OF A PREFERRED EMBODIMENT

Figure 1:
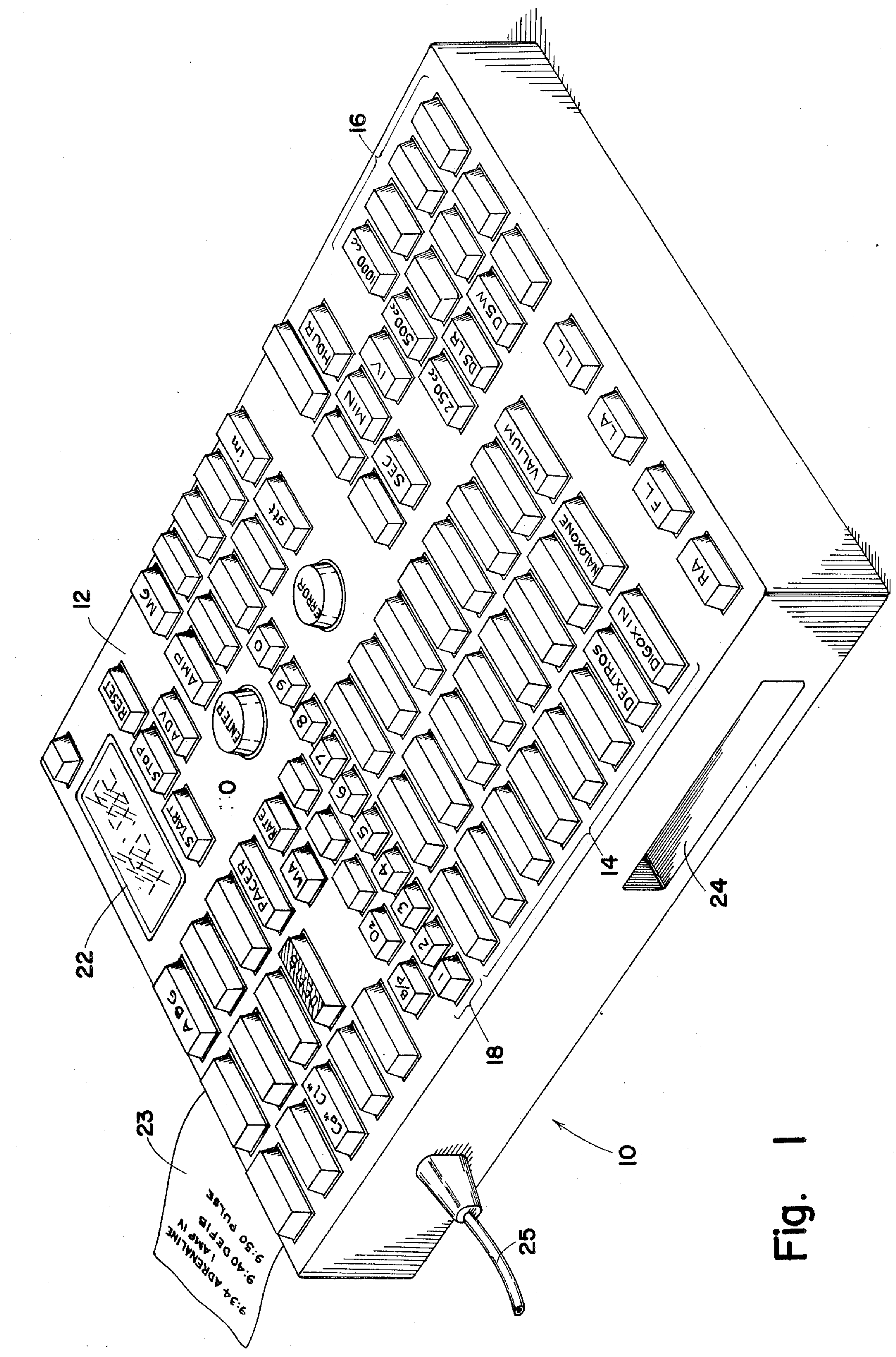
FIG. 1 is a view in perspective of the recording and monitoring device of this invention.

Referring now to FIG. 1 with greater particularity, the recording and monitoring device 10 of this invention includes a key board 12 having a plurality of keys, each of which had imprinted thereon a legend indicating a specific medication, quantity, treatment or operation. For example, one group of keys 14 is coded to indicate the particular medication being given; another group of keys 16 represent the amount and types of intravenous medication; numerical digits to designate quantity are at 18; and the "Enter" button to be pressed at the time the dosage or treatment is applied, is at 20. A digital clock showing the time of day is included at 22 and when the "Enter" button is depressed the time of day, just as the data input by the keys, is entered in sequence on a printing tape 23 by a thermal printing device in the case 10. At the same time, the same information is recorded on a magnetic tape cassette 24 along with signals input at 25 from an electrocardiogram (not shown).

Figure 2:
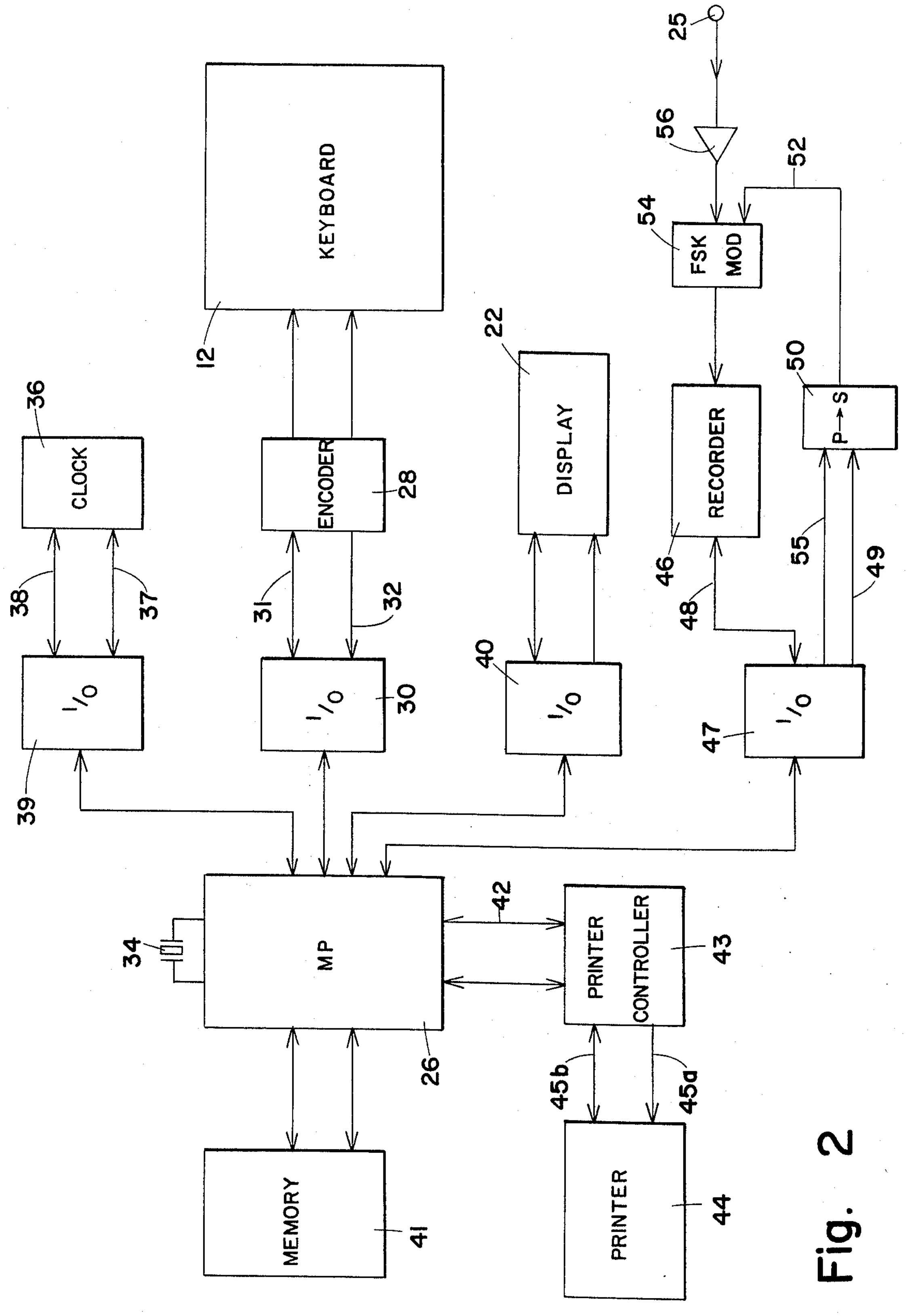
FIG. 2 is a schematic diagram of the electronic circuitry.

Referring now to FIG. 2 the operator of the recording and monitoring device 10 employs the medium of the keyboard 12 to communicate with a single chip microprocessor 26 which controls the operation of all the devices in the circuit, using a crystal 34 as a timing reference to control its internal operations. The keyboard comprises a matrix of single-action, hand wired switches, which are scanned by an encoder circuit 28, and there converted into a digital code which is understood and used by the microprocessor 26. The input/output capacity of the microprocessor may be expanded by an input/output expansion circuit 30 in order to accept signals from the keyboard circuitry.

In operation, digital information in the form of timing and control signals to operate the encoder 28 are transmitted at 31 and digital information from the encoder in the form of BCD codes indicating which key has been pressed are transmitted at 32.

With the information transmitted from the keyboard 12, as just described, the time of day is also transmitted to the microprocessor from the clock circuit 36. The clock circuit 36 provides a digital code output at 37 to the microprocessor indicating the time of day. The microprocessor, in turn, can transmit data from the keyboard 12 to set the clock circuit 36 to the correct time. In addition, digital information is exchanged at 38 between an input/output device 39 and the clock circuit 36 to operate the latter.

The microprocessor 26 routes the time code signal to the LED display device 22 on the face of the monitor 10, through an input/output expansion circuit 40. The display 22 could be used to show the time of day: it could show elapsed time; and it could verify the treatment, dosage etc. signalled by a key pressed at the keyboard 12, before the "Enter" button 20 is pressed to record the event. The memory circuit 41 is used for storage of the control program and other data used in operation of the treatment recorder and monitor 10.

Digital information in the form of timing and control signals from the microprocessor 26 are transmitted at 42 to a printer controller circuit 43 which performs all of the timing and control functions involved in the operation of the thermal printer 44 to imprint the codes and other information input by the operator at the keyboard 12. Print-head control information, which is used to form the characters on the paper strip 23 is transmitted at 45*a*, and signals to operate the printers are transmitted at 45*b*.

In addition to the display 22 and the printer 43, signals from the microprocessor 26 are transmitted to the magnetic tape recorder 46 through an input/output expansion circuit 47. Timing and control signals to operate the recorder 46 are transmitted at 48, and digital information, in the form of binary codes input at the keyboard 12, are transmitted at 49 to a parallel-to-serial shift register 50. The shift register 50 accepts this data in parallel eight-bit form and transmits it at 52 in serial mode to a frequency-shift keying modulator circuit 54. Timing and control signals to operate the shift register are transmitted from the input/output device at 55.

The frequency-shift-keying modulator circuit accepts the binary information containing the codes, which are input by the operator at the keyboard 12 and, in addition, signals from the external EKG connector 25 (FIG. 1), which are processed and filtered at a buffer amplifier 56. The two sets of signals are modulated at 54 on two separate audio-frequency channels to be recorded and stored at the tape cassette recorder 46.

Summarizing the operation, planned events are input at the keyboard 12 as they are to be carried out; they are confirmed at the display 22 which, otherwise, continuously shows time of day or elapsed time; and they are entered and sent to the microprocessor by depressing the "Enter" key as they are performed. The microprocessor 26 transmits signals representative of the events performed, as well as the time signal, to the printer controller 42 for a visual record and to the cassette recorder 46 to be recorded along with signals from the external EKG 28.

While this invention has been described in conjunction with a preferred embodiment thereof, it is obvious that modifications and changes may be made therein by those skilled in the art to which it relates without departing from the spirit and scope of this invention, as defined by the claims appended hereto.

What I claim as invention is:

1. A medical procedure recording and monitoring device comprising:
- a keyboard;
- a first series of keys on said keyboard, each representing a medical treatment;
- a treatment signal circuit operative when energized to transmit an electrical signal representative of the medical treatment selected by a key;
- a clock circuit operative when energized to transmit signals indicating time;
- selectively operated enter means to energize said signal transmitting circuits; and
- a recording device to record signals so transmitted.

2. The medical procedure recording and monitoring device defined by the claim 1 wherein said recording device includes;
- a thermal printing device activated by said signals.

3. The device defined by claim 1 including:
- a digital LED display operated by said clock circuit.

4. The device defined by claim 1 including:
- a fourth series of keys on said keyboard, each representing a numerical digit; and
- a digit signal circuit operative when energized to transmit electrical signals representative of the digit designated by one of said fourth series of keys;
- said digit signal circuit being energized by said selectively operated enter means.

5. The medical procedure recording and monitoring device defined by claim 1 wherein said recording device includes:
- a magnetic tape recorder to record said signals.

6. The medical procedure recording and monitoring device defined by claim 5 wherein:
- said tape recorder is operative to record on two channels, and including:
- conductor means for transmitting electrical signals from an electrocardiogram machine to said tape recorder.

7. The device defined by claim 1 including:
- a second series of keys on said keyboard, each representing a medication; and
- a medication signal circuit operative when energized to transmit electrical signals representative of the medication designated by one of said second series of keys;
- said medical signal circuit being energized by said selectively operated enter means.

8. The device defined by claim 7 including:
- a third series of keys on said keyboard, each representing a dosage quantity; and
- a dosage signal circuit operative when energized to transmit electrical signals representative of the dosage designated by one of said third series of keys;
- said dosage signal circuit being energized by said selectively operated enter means.

* * * * *